(12) United States Patent
Brackenbury et al.

(10) Patent No.: US 10,696,189 B2
(45) Date of Patent: Jun. 30, 2020

(54) VEHICLE SEATS WITH SMART DEVICE LOCATOR CONTROL SYSTEM

(71) Applicant: Lear Corporation, Southfield, MI (US)

(72) Inventors: James Brackenbury, El Paso, TX (US); Samuel Hanlon, Northville, MI (US); Karl Henn, New Hudson, MI (US)

(73) Assignee: Lear Corporation, Southfield, MI (US)

( * ) Notice: Subject to any disclaimer, the term of this patent is extended or adjusted under 35 U.S.C. 154(b) by 413 days.

(21) Appl. No.: 15/848,067

(22) Filed: Dec. 20, 2017

(65) Prior Publication Data

US 2019/0184857 A1    Jun. 20, 2019

(51) Int. Cl.
| | | |
|---|---|---|
| *B60N 2/02* | (2006.01) | |
| *B60N 2/01* | (2006.01) | |
| *B60R 16/037* | (2006.01) | |
| *B60N 2/90* | (2018.01) | |
| *B60R 16/027* | (2006.01) | |

(52) U.S. Cl.
CPC .............. *B60N 2/0224* (2013.01); *B60N 2/01* (2013.01); *B60N 2/90* (2018.02); *B60R 16/027* (2013.01); *B60R 16/037* (2013.01)

(58) Field of Classification Search
CPC .......... B60N 2/0224; B60N 2/90; B60N 2/01; B60R 16/027; B60R 16/037
USPC .......................................................... 701/49
See application file for complete search history.

(56) References Cited

U.S. PATENT DOCUMENTS

| | | |
|---|---|---|
| 8,036,715 B2 | 10/2011 | Buck et al. |
| 8,145,199 B2 | 3/2012 | Tadayon et al. |
| 8,315,617 B2 | 11/2012 | Tadayon et al. |
| 8,325,938 B2 | 12/2012 | Yokota |
| 8,483,775 B2 | 7/2013 | Buck et al. |
| 9,172,811 B2 | 10/2015 | Tadayon et al. |
| 9,338,536 B2 | 5/2016 | Barksdale et al. |
| 2012/0006610 A1 | 1/2012 | Wallace et al. |
| 2012/0119551 A1* | 5/2012 | Brncick ................ B60N 2/643 297/284.2 |

* cited by examiner

*Primary Examiner* — Gertrude Arthur Jeanglaude
(74) *Attorney, Agent, or Firm* — MacMillan, Sobanski & Todd, LLC

(57) ABSTRACT

A vehicle seat control system comprises a plurality of seats, a plurality of wireless receivers arranged about the seats, a controller for each of the seats, and a data network between the wireless receivers and controllers. Each of the seats has a seat customization function controlled by its controller. The wireless receivers receive a wireless signal from a portable electronic device. At least one of the controllers measures signal strengths and times of flight for the wireless signal using the wireless receivers, analyzes the signal strengths and times of flight to detect a location of the electronic device, and determines if the location is in any of the seating zones. When the location is in one of the seating zones, the seat customization function for the seating zone with the location is controlled according to the electronic device.

20 Claims, 6 Drawing Sheets

VEHICLE SEATS WITH SMART DEVICE LOCATOR CONTROL SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle seats and, more specifically, to a control system for locating a smart device to control a seat customization function of a vehicle seat.

Seats in automotive vehicles have increasing numbers of seat customization functions. For example, the vehicle seat may be provided with extensive controls to adjust its position or with comfort systems such as warming, cooling, and massage. Other seat functions may include apparatus for listening to audio or watching video. An occupant of the vehicle seat may use a smartphone or other device to interact with and control the seat customization functions. A wireless network may link the smartphone with the vehicle seat for the occupant's control of the seat customization functions through the smartphone. For the occupant's convenience, such networking may be performed automatically. However, most vehicles have multiple vehicle seats, each of which may have an occupant wanting to control his or her seat customization functions with a smartphone. This may be especially prevalent in, for example, ride sharing vehicles, buses, trains, or planes with multiple passengers each having a smartphone and wanting to control his or her seat customization functions. Thus, it would be desirable to locate the occupant's smartphone in the vehicle so that it may be correctly linked with the occupant's seat to control the seat customization functions.

SUMMARY OF THE INVENTION

This invention includes a vehicle seat control system. The control system includes a plurality of vehicle seats and a plurality of in-vehicle wireless receivers arranged about the vehicle seats in any manner that allows for location of smart devices and seat control. Each of the vehicle seats has a seat customization function and a controller. A data network is between the wireless receivers and the controllers. A seating zone is defined for each seating position of the vehicle seats. Alternatively, a single, multi-channel controller may be provided for two or more of the vehicle seats.

The wireless receivers receive a wireless signal from a portable electronic device associated with a vehicle occupant. The wireless signal may be a Wi-Fi, Bluetooth, cellular signal, or any other wireless data technology. At least one of the controllers uses the wireless receivers to measure signal strengths and times of flight for the wireless signal. The controller analyzes the signal strengths and times of flight using radiolocation principles to detect a device location of the electronic device. The controller then determines if the device location is in any of the seating zones. When the device location is in one of the seating zones, the controller automatically associates the electronic device with the vehicle seat for the seating zone of the device location and links the electronic device with the controller for the associated vehicle seat. The controller then controls the seat customization function of the vehicle seat according to the electronic device. The controller may automatically control the seat customization function according to the electronic device to customize an experience for the occupant.

The seat customization function may be an audio speaker or video screen to which the controller streams music or video from the electronic device. Alternatively, the seat customization function may be a power adjustment or seat comfort—e.g., warming, cooling, or massage—device for which the controller downloads a setting from the electronic device. The controller then controls the device to satisfy the setting.

The seat customization function may also be an occupancy dependent device for which the location of the electronic device within the seating zone indicates occupancy of the vehicle seat. The occupancy dependent device may be an airbag safety device. The controller may enable the airbag safety device when the electronic device is within the seating zone.

Furthermore, in response to first data received from the electronic device, the controller may download second data to the seat customization function from a cloud storage system. The first data may be a playlist and the second data may be music or video for the playlist. Additional data may be transmitted, via the electronic device, from the controller to the cloud storage system for analysis. The seat customization function then plays the music or video. Alternatively, the first data may be an identifier for a user of the electronic device and the second data may be a setting for the seat customization function. The controller then controls the seat customization function to satisfy the setting.

The wireless receivers may be incorporated into the controllers. Alternatively, at least one of the wireless receivers may be external to the controllers.

DETAILED DESCRIPTION OF PREFERRED EMBODIMENTS

Figure 1:
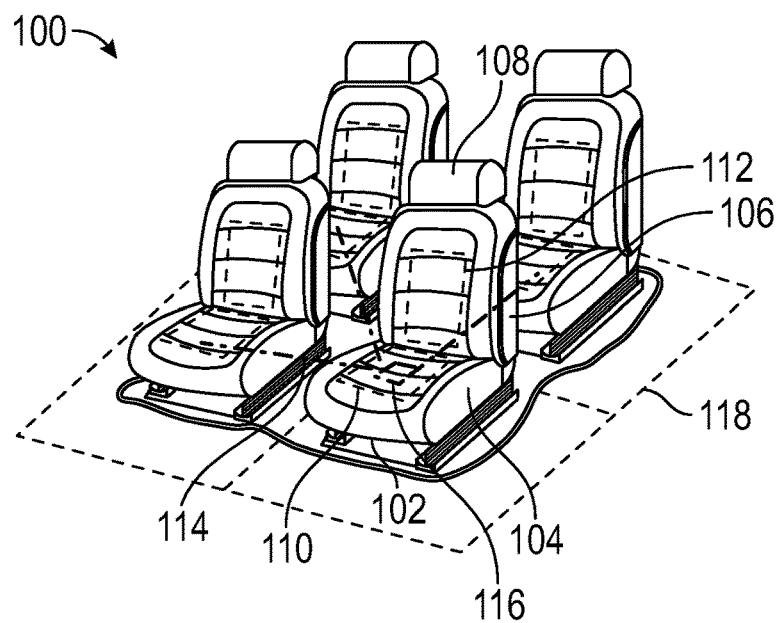
FIG. 1 is a perspective view showing a vehicle seat control system according to an embodiment of the present invention.

Referring now to FIG. 1, there is illustrated a vehicle seat control system, indicated generally at 100, according to an embodiment of the present invention. The vehicle seat control system 100 has a plurality of vehicle seats 102. Although the vehicle seats 102 are illustrated in FIG. 1 as four bucket seats arranged in two rows, the vehicle seats 102 may be more or less than four in quantity, of any style (e.g., bucket, bench, or captain), arranged in any number of rows, and with any quantity of seats in the rows. As a non-limiting example, the vehicle seats 102 may include one or more bench seats each having two or more seating positions (i.e., zones) with a possible occupant in each of the seating positions.

Each of the vehicle seats 102 has a seat bottom 104 and seat back 106 mounted to the seat bottom 104. Attached to the seat back 106 is a headrest 108. The vehicle seat control system 100 is not limited to use with the particular vehicle seats 102 illustrated in FIG. 1 and the vehicle seats 102 are not limited to the specific structure or appearance illustrated in FIG. 1. As a non-limiting example, the seats 102 may be fabricated as rigid, fiberglass shells. As a further non-limiting example, the seats 102 may omit the seat back 106. Each of the vehicle seats 102 further has at least one controller 110 (shown by dashed lines in the seat bottom 104) and at least one seat customization function or component 112 (shown by dashed lines in the seat back 106). Although the controller 110 is illustrated within the seat bottom 104, the controller 110 may alternatively be located elsewhere in the vehicle seat 102, such as in the seat back 106, or external to the vehicle seat 102. Alternatively, the controller 110 may be located in any suitable location for controlling the seat customization function 112. Alternatively, the controller 110 may be a single, multi-channel controller for two or more of the vehicle seats 102. Similarly, although the seat customization function 112 is illustrated within the seat back 106, the seat customization function 112 may be located elsewhere within the vehicle seat 102, such as in the seat bottom 104 or the headrest 108.

The seat customization function 112 is any function, feature, device, or apparatus of the vehicle seat 102 that may be operated, customized, be changed by, change in response to, or otherwise interact with, an occupant of the vehicle seat 102. Although the seat customization functions 112 are represented for each of the vehicle seats 102 by single dashed boxes, each of the vehicle seats 102 typically has more than one seat customization function 112. As non-limiting examples, the seat customization function 112 may be one or more of an audio speaker in the headrest 108 to which audio is streamed, a video display screen to which video is streamed, a power seat adjustment device, an airbag safety device, a seat warming or cooling device, a seat massage device, or biometric monitoring of the occupant—e.g., a heart rate monitor. Specific seat customization functions 112 provided for the vehicle seats 102 may differ between each of the vehicle seats 102—e.g., streaming of audio or video may be provided for rear row vehicle seats 102 only. The seat customization functions 112 are not limited to the examples given herein. A device performing a seat customization function for one particular seat can even be placed in an adjacent seat or elsewhere in a vehicle. As a non-limiting example, a video screen for an occupant of a first seat may be placed in a rear surface of a seat back of a second seat that is in front of the first seat. Such an arrangement is commonly found on airplanes.

The controllers 110 are interconnected by a data network 114. As illustrated in FIG. 1, the data network is a hub network with one of the controllers 110 being a hub or node with which the other controllers 110 communicate. Alternatively, the data network 114 may be other than illustrated. As a non-limiting example, the data network 114 may be a peer to peer network between the controllers 110. The controllers 110 are further connected to the corresponding seat customization functions 112 by the data network (shown in FIGS. 2 and 3). The seat customization functions 112 for each of the vehicle seats 102 are controlled by the controller 110 in each of the vehicle seats 102.

The data network 114 includes a wireless portion. Each of the controllers 110 has a wireless receiver 116 that is preferably a wireless transceiver. As a non-limiting example, the wireless portion of the data network 114 may be a Wi-Fi network. When the data network 114 is a Wi-Fi network, the wireless receivers 116 are Wi-Fi transceivers. The controllers 110 may be interconnected by the wireless portion of the data network 114 or a wired portion of the data network 114 (as a non-limiting example, the wired portion may be an Ethernet network). Also, the controllers 110 may be connected with their corresponding seat customization functions 112 by the wireless or wired portion of the data network 114.

As illustrated, four of the wireless receivers 116 are provided for the vehicle seat control system 100, although more or fewer than four may be provided. Preferably, at least three of the wireless receivers 116 are provided in order to provide reliable triangulation, although as few as two of the wireless receivers 116 may be provided.

Furthermore, as will be discussed with reference to FIG. 9, additional wireless receivers 116 may be provided external to the controllers 110. The additional wireless receivers 116 may be provided external to the controllers 110 but internal to the vehicle seats 102 or external to both the controllers 110 and vehicle seats 102. The wireless receivers 116 external to the controllers 110 are connected to the controllers 110 by the data network 114. The wireless receivers 116 may be provided at any suitable location in a vehicle 120 (the vehicle 120 being shown in FIGS. 2 and 3).

As illustrated, each of the vehicle seats 102 is a seating position in which a respective occupant sits. Each of the vehicle seats 102 may have multiple seating positions with each of the seating positions having a customization function 112 and controller 110. Spatially defined around each of the seating positions of the vehicle seats 102 is a seating zone 118. Although illustrated in two dimensions for clarity in FIG. 1, each of the seating zones 118 includes vertical dimensions such that the seating zones 118 are three dimensionally defined as volumes.

The seating zones 118 are defined such that there is no overlap or common area between any of the seating zones 118. The seating zones 118 may further be defined to extend outside of the vehicle 120 in which the vehicle seats 102 are located. As illustrated, the seating zones 118 have substantially square or quadrilateral shapes. Alternatively, the seating zones 118 may have any other shape. As a non-limiting example, the seating zones 118 may have polygonal, non-polygonal (i.e., curved), or combinations of polygonal and non-polygonal shapes. Preferably, the seating zone 118 for each of the vehicle seats 102 is defined to represent an area or volume of the vehicle 120 in which the occupant of the vehicle seat 102 is likely to hold or place a portable electronic device or personal smart device 122 (shown in FIGS. 2 and 3). As non-limiting examples, the portable electronic device 122 may be a smart device such as a smartphone, a tablet computing device. As a further non-limiting example, the portable electronic device 122 may be a wearable device such as a smartwatch or fitness tracker used with or without a smartphone or tablet computing device.

As illustrated, one of the wireless receivers 116 is provided for each of the seating zones 118, respectively. Alternatively, the wireless receivers 116 may be arranged other than as shown in FIG. 1—i.e., one of the seating zones 118 may have more or fewer than one of the wireless receivers 116. The wireless receivers 116 are preferably arranged about the vehicle 120 to receive a wireless signal from the electronic device 122. The wireless signal will be discussed further with reference to FIG. 2.

The vehicle 120 having the vehicle seat control system 100 and vehicle seats 102 may be any automotive vehicle such as a passenger car. Alternatively, the vehicle seat control system 100 and vehicle seats 102 may be in an automotive vehicle such as a taxi, shuttle, van, bus, coach, or ride sharing vehicle. Alternatively, the vehicle seats 102 may be in a non-automotive vehicle such as a train, ferry, or airplane.

As illustrated in FIG. 1, each of the vehicle seats 102 has a single seating position for a single occupant. As such, each of the vehicle seats 102 has a single seating zone 118. Alternatively, one or more of the vehicle seats 102 may be intended for multiple occupants and have multiple seating positions. Each of the multiple seating positions would have a separate seating zone such that the vehicle seat has more than one seating zone. As a non-limiting example, a bench seat may have multiple seating positions and one seating zone for each of the seating positions.

The vehicle seats 102 may be used in combination with other vehicle seats that may not have seat customization functions 112 or have seat customization functions 112 that are not controlled by a controller 110.

Figure 2:
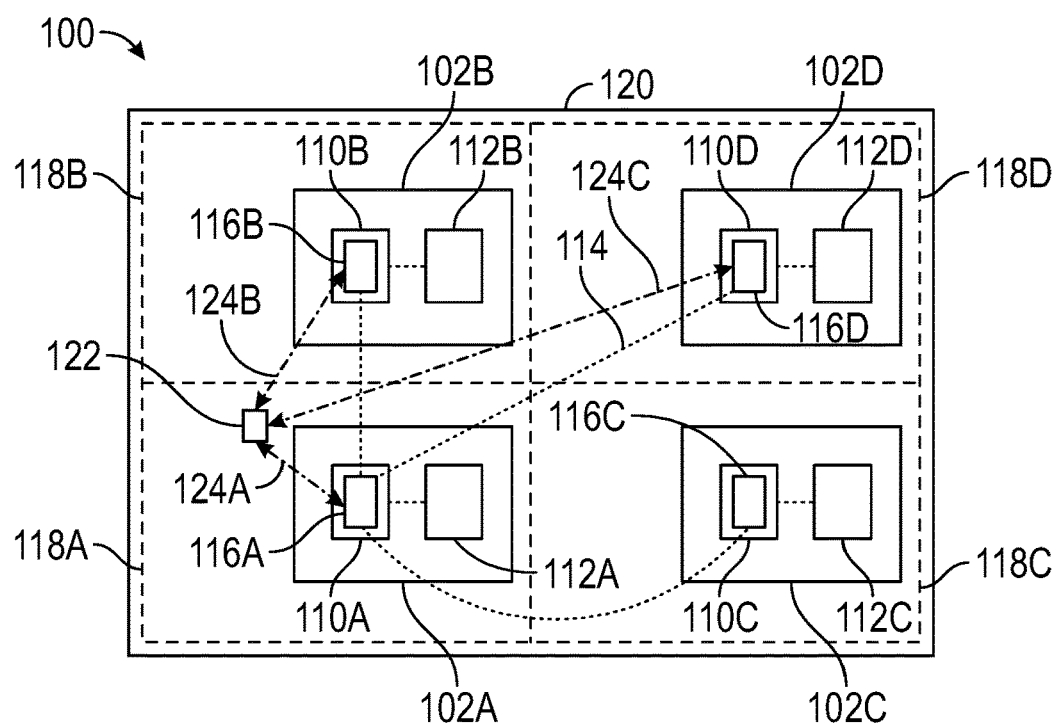
FIG. 2 is a schematic view showing the vehicle seat control system of FIG. 1 locating a portable electronic device.

Referring now to FIG. 2, the vehicle seats 102 are schematically illustrated as first, second, third, and fourth vehicle seats 102A, 102B, 102C, and 102D, respectively. The first vehicle seat 102A has a first controller 110A, seat customization function 112A, wireless receiver 116A, and seating zone 118A. Similarly, the second vehicle seat 102B has a second controller 110B, seat customization function 112B, wireless receiver 116B, and seating zone 118B; the third vehicle seat 102C has a third controller 110C, seat customization function 112C, wireless receiver 116C, and seating zone 118C; and the fourth vehicle seat 102D has a fourth controller 110D, seat customization function 112D, wireless receiver 116D, and seating zone 118D. Alternatively, one or more of the first, second, third, or fourth controllers 110A, 110B, 110C, or 110D, respectively, may be omitted when a multi-channel controller is provided.

As illustrated, the first controller 110A is a master controller and the second, third, and fourth controllers 110B, 110C, and 110D, respectively, are slave controllers. Alternatively, the first, second, third, and fourth controllers 110A, 110B, 110C, and 110D, respectively, may each operate without a master/slave relationship. When operating without the master/slave relationship, one of the controllers 110 is provided for each of the seating zones 118 and the controller 110 for each of the seating zones 118 only detects the electronic device 122 within its corresponding seating zone 118.

In addition to the wireless portion of the data network 114, the first, second, third, and fourth wireless receivers 116A, 116B, 116C, and 116D, respectively, also receive the wireless signal from the electronic device 122. As non-limiting examples, the wireless signal may be a Wi-Fi, Bluetooth, cellular signal, or any other wireless data technology. As will be discussed, the wireless signal is used by the first—i.e., master—controller 110A to locate the electronic device 122 relative to the first, second, third, and fourth seating zones 118A, 118B, 118C, and 118D, respectively.

All of the first, second, third, and fourth wireless receivers 116A, 116B, 116C, and 116D, respectively, receive the wireless signal from the electronic device 122. Wireless signal strengths and times of flight are preferably measured by the first controller 110A using any three of the first, second, third, and fourth wireless receivers 116A, 116B, 116C, and 116D, respectively. However, the three of the first, second, third, and fourth wireless receivers 116A, 116B, 116C, and 116D, respectively, most strongly receiving the wireless signal are preferably used to measure the wireless signal strengths and times of flight to locate the electronic device 122. As illustrated, the first, second, and fourth wireless receivers 116A, 116B, and 116D, respectively, are most strongly receiving the wireless signal and are thus used by the first controller 110A to locate the electronic device 122. Alternatively, as few as two or more than three of the first, second, third, and fourth wireless receivers 116A, 116B, 116C, and 116D, respectively, may be used to locate the electronic device 122.

In FIG. 2, the first, second, and fourth wireless receivers 116A, 116B, and 116D are used by the first controller 110A to measure the wireless signal strength and time of flight (represented by dash dot lines 124A, 124B, and 124C) for the wireless signal emitted by the electronic device 122. The first controller 110A then analyzes the wireless signal strengths and signal times using radiolocation principles to calculate a device location of the electronic device 122.

Figure 3:
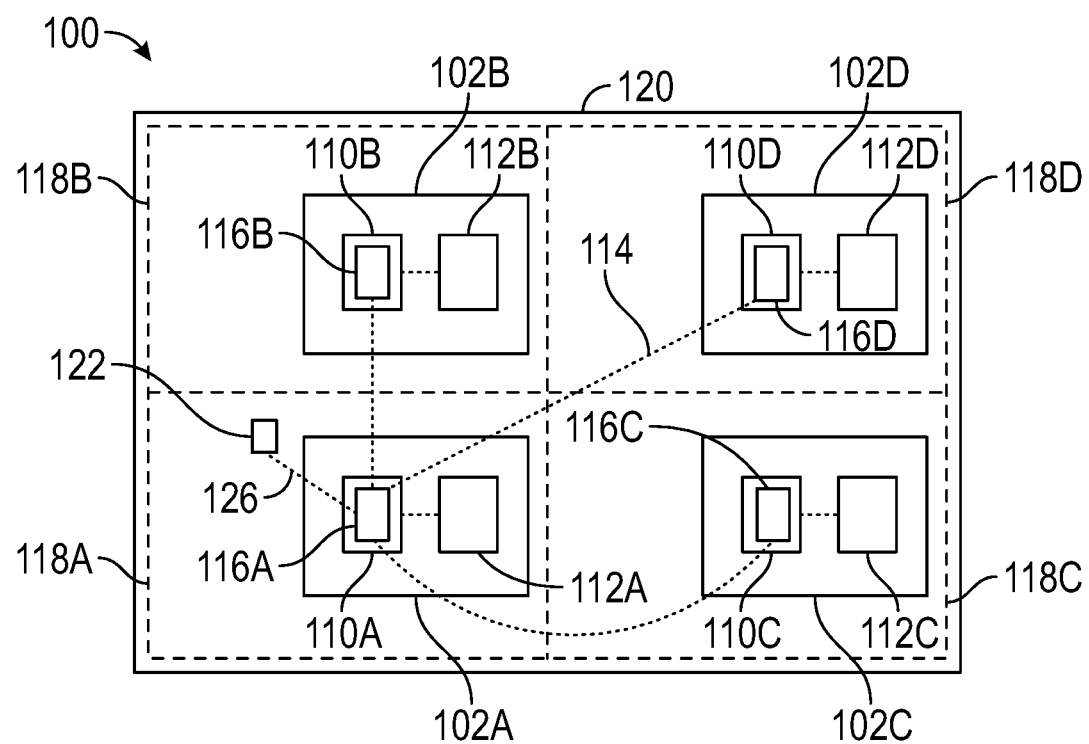
FIG. 3 is a schematic view showing the vehicle seat control system of FIG. 1 controlling a seat customization function according to the located electronic device.

Referring now to FIG. 3, the electronic device 122 is associated with the first vehicle seat 102A because the device location is within the first seating zone 118A. A data link 126 of the data network 114 is established between the electronic device 122 and the first controller 110A such that the electronic device 122 is network linked with the first controller 110A. Software on the electronic device 122 may then interact with the first controller 110A to control the first seat customization function 112A. The first seat customization function 112A is controlled by the first controller 110A according to the electronic device 122 (via the software). As a non-limiting example, the software may be an application or app downloaded to the electronic device 122 by a user of the electronic device 122, wherein the user is expected to be the occupant of the vehicle seat 102.

The electronic device 122 may be used to provide "over the air" software updates to the seat controller 110 and/or seat customization function 112. The electronic device 122 may also be used to enable subscription services for the seat customization function 112. As non-limiting examples, the subscription services may include audio or video streamed to the seat customization function, enablement of seat customization functions such as heating, cooling, or massage, or provision of data collected by the seat customization function to a third party—e.g., data collected by a heart rate monitor device may be provided to a medical provider.

Furthermore, data may be automatically transferred between the software and electronic device 122 without intervention by the user of the electronic device 122. As a first non-limiting example, audio or video may automatically stream from the electronic device 122 to the first vehicle seat 102A when the first seat customization function 112A is a video display or speaker. As a second non-limiting example, the first vehicle seat 102A may automatically adjust its physical configuration to a setting downloaded from the electronic device 122 when the first seat customization function 112A is a power seat adjustment device. The first example will be further discussed with reference to FIG. 5 and the second example will be further discussed with reference to FIG. 6.

Figure 4:
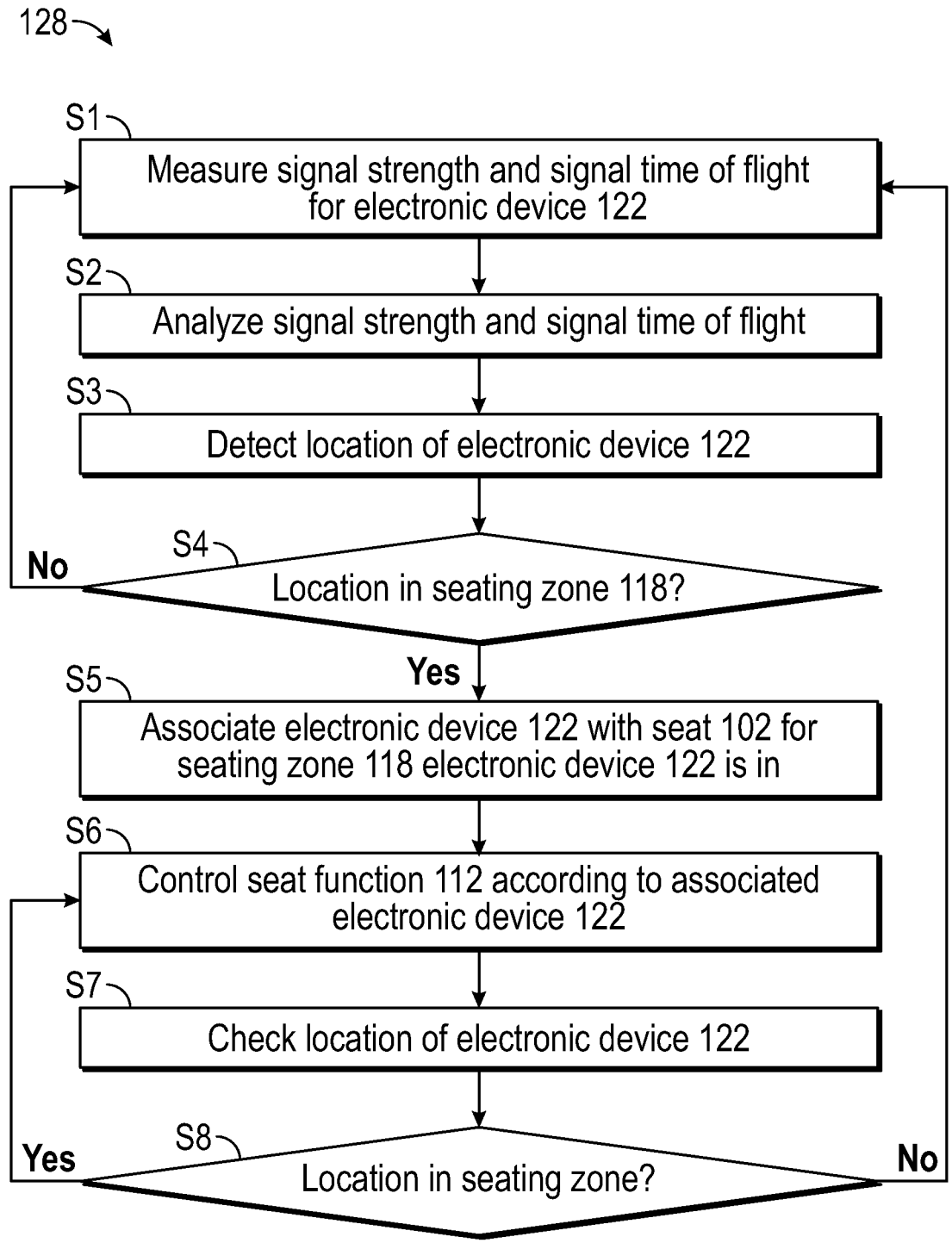
FIG. 4 is a flowchart for the vehicle seat control system of FIG. 1.

Referring now to FIG. 4, there is a flowchart for a control method, indicated generally at 128, for the vehicle seat control system 100.

In a step S1, the wireless receivers 116 are used by at least one of the controllers 110 to measure the signal strengths and times of flights for the wireless signal transmitted by the electronic device 122. In FIG. 3, the first, second, and fourth wireless receivers 116A, 116B, and 116D, respectively, are used by the first controller 110A to measure the signal strengths and times of flights for the wireless signal transmitted by the electronic device 122.

In a step S2, the at least one controller 110 analyzes the wireless signal strengths and times of flight. Then, from the analysis, the at least one controller 110 detects the device location of the electronic device 122 in a step S3. In FIG. 3, the first controller 110A analyzes the wireless signal strengths and times of flight to detect the device location of the electronic device 122.

In a step S4, the at least one controller 110 determines if the device location is within one of the seating zones 118, respectively. When the device location is not within one of the seating zones 118, the control method 128 returns to the step S1. When the device location is within one of the seating zones 118, respectively, the control method 128 proceeds to a step S5 in which the electronic device 122 is associated with the vehicle seat 102 corresponding to the seating zone 118 in which the electronic device 122 is located. Associating the electronic device 122 with the corresponding vehicle seat 102 also includes networking, pairing, or otherwise linking the electronic device 122 with the controller 110 for the corresponding vehicle seat 102. The associating and networking of step S5 is preferably performed automatically without intervention from the user of the electronic device 122. In FIG. 3, the electronic device 122 is in the first seating zone 118A for the first vehicle seat 102A. As a result, the electronic device 122 is associated with the first vehicle seat 102A and network linked with the first controller 110A.

In a step S6, the seat customization function 112 is controlled by the at least one controller 110 according to the electronic device 122. As a non-limiting example, the seat customization function 112 may be controlled according to data automatically transferred between the electronic device 122 and the at least one controller 110. In FIG. 3, the first seat customization function 112A is controlled according to the electronic device 122. Specifically, in FIG. 3, the first seat customization function 112A is controlled by the first controller 110A according to data transferred from the electronic device 122 to the first controller 110A.

Then, in a step S7, the device location is checked. In a step S8, when the device location remains in the same seating zone 118, the control method 128 returns to the step S6 and the seat customization function 112 continues being controlled according to the electronic device 122. Otherwise for the step S8, when the device location is no longer in the seating zone 118, the seat customization function 112 stops being controlled according to the electronic device 122 and the control method 128 returns to the step S1. In FIG. 3, when the electronic device 122 remains in the first seating zone 118A, the first seat customization function 112A continues being controlled according to the electronic device 122 and, when the electronic device 122 is no longer in the first seating zone 118A, the first seat customization function 112A stops being controlled according to the electronic device 122.

Figure 5:
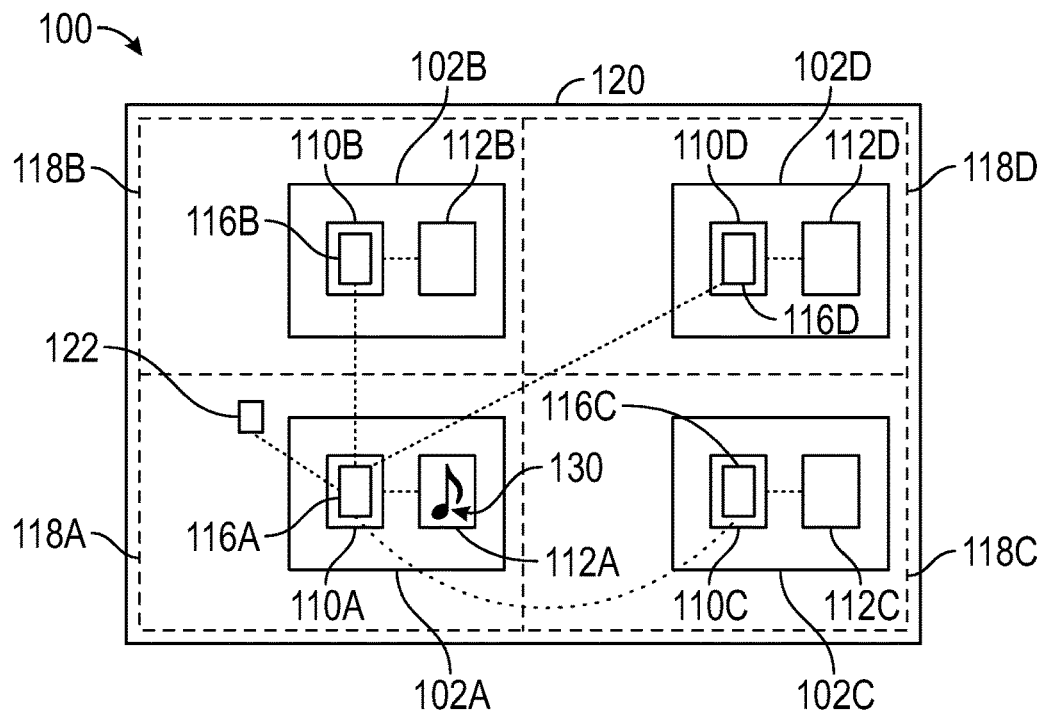
FIG. 5 is a schematic view showing the vehicle seat control system of FIG. 1 streaming data to a first seat customization function according to the electronic device.

Referring now to FIG. 5, there is illustrated an example of the vehicle seats 102 where the first controller 110A controls the first seat customization function 112A to stream data from the electronic device 122 to the first seat customization function 112A through the first controller 110A. The first controller 110A receives the streamed data from the electronic device 122 via the data network 114, including the data link 126. As non-limiting examples, the streamed data may be audio or video, indicated generally at 130. The streamed data may be selected by the user using the software on the electronic device 122. As non-limiting examples, the first seat customization function 112A may be an audio speaker or video screen, wherein the audio speakers may be located in the headrest 108. Alternatively, the first seat customization function 112A may be a master multichannel audio system to the first vehicle seat 102A. When the first seat customization function 112A is an audio speaker or video screen, the streamed audio or video is then played on the audio speaker or video screen.

Figure 6:
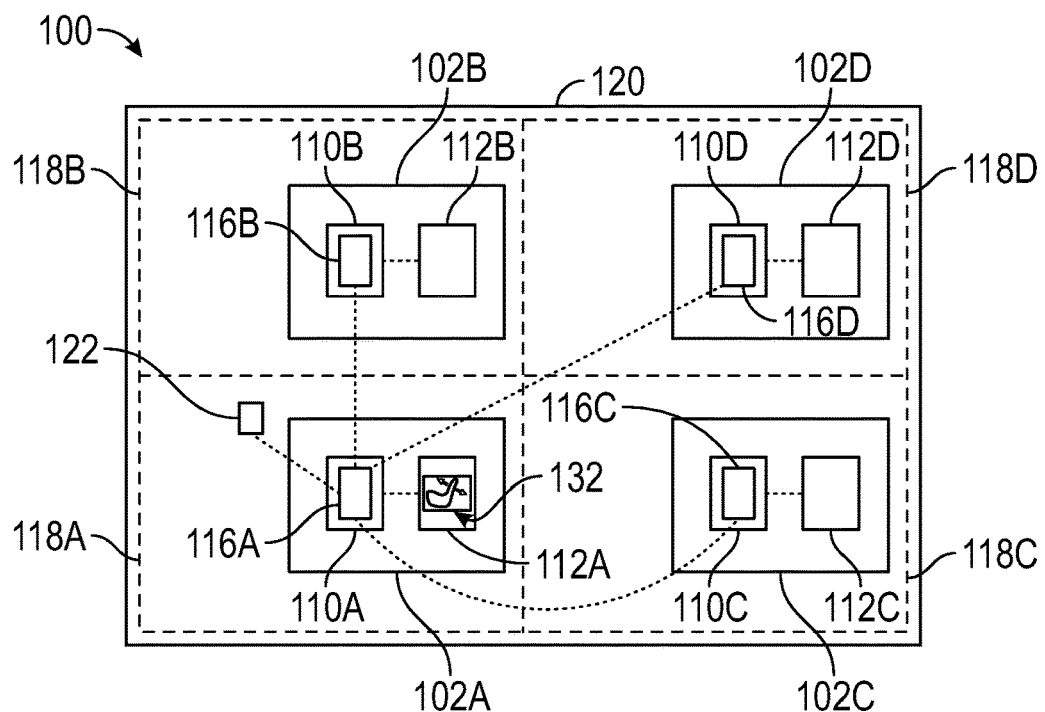
FIG. 6 is a schematic view showing the vehicle seat control system of FIG. 1 wherein the electronic device provides a setting for a second seat customization function.

Referring now to FIG. 6, there is illustrated an example of the vehicle seats 102 where the first controller 110A downloads data from the electronic device 122 and then controls the first seat customization function 112A according to the data from the electronic device 122. The data may be one or more personalized comfort adjustments for the first seat customization function 112A. The first controller 110A receives the setting from the electronic device 122 via the data network 114, including the data link 126. The first controller 110A then sends commands to the first seat customization function 112A according to the data. The data downloaded from the electronic device 122 to the first controller 110A is not itself transferred or transmitted—e.g., streamed—to the first seat customization function 112A. As a non-limiting example, the first seat customization function 112A may be a power seat adjustment device, indicated generally at 132, and the data may be a setting such as a preferred position or physical configuration for the power seat adjustment device 132. As a further non-limiting example, the data may be a temperature preference when the first seat customization function 112A is a seat heating or cooling device.

The setting may be set by the user using the software on the electronic device 122 or, alternatively, the setting may be set using the power seat adjustment device 132 and saved or otherwise recorded by the software on the electronic device 122 for future use. The first controller 110A sends the commands to the first seat customization function 112A to control the first seat customization function 112A and satisfy the setting. For the power seat adjustment device 132, the first controller 110A sends the commands to control the power seat adjustment device 132 to be in the position or physical configuration received from the electronic device 122. Preferably, the setting is automatically provided to the first controller 110A when the electronic device 122 is associated with the first seating zone 118A and the first controller 110A automatically controls the power seat adjustment device 132 in response to the setting.

Figure 7:
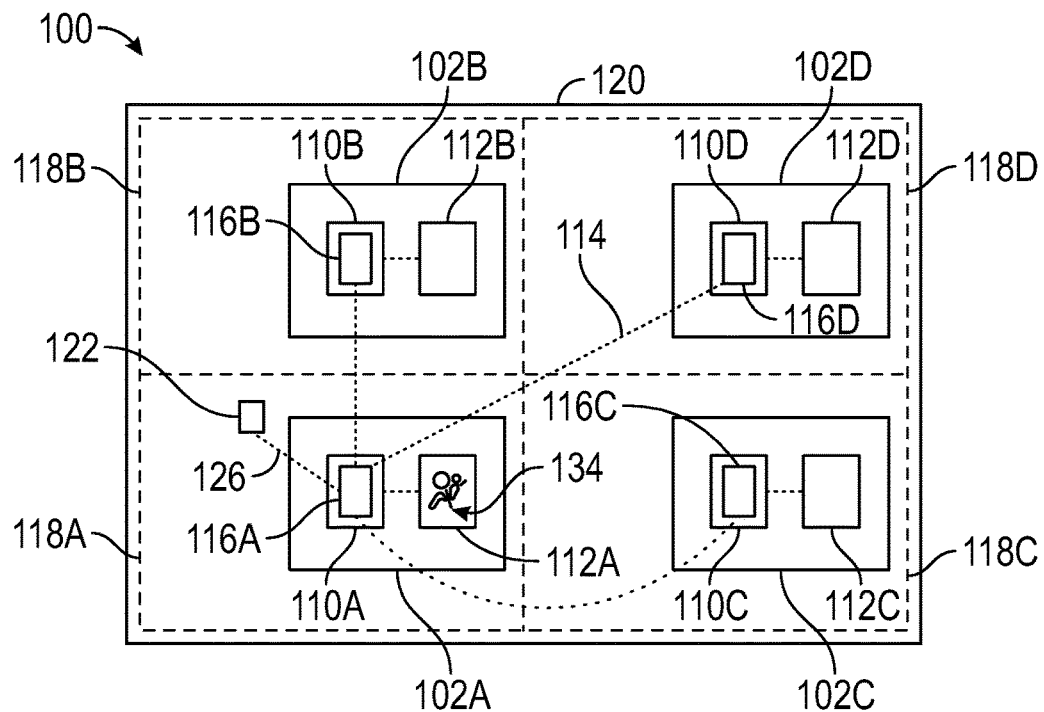
FIG. 7 is a schematic view showing the vehicle seat control system of FIG. 1 wherein the electronic device indicates an occupancy status for a third seat customization function.

Referring now to FIG. 7, there is illustrated an example of the vehicle seats 102 where the electronic device 122 provides an occupancy status for the first controller 110A and the first controller 110A controls the first seat customization function 112A according to the occupancy status. As a non-limiting example, the first seat customization function 112A may be an airbag safety device, indicated generally at 134, that is controlled by the first controller 110A according to the electronic device 122—i.e., according to the occupancy status. As a further non-limiting example, the first seat customization function 112A may be a biometric monitoring device such as a heart rate monitor. For the airbag safety device 134, the first controller 110A may enable the airbag safety device 134 when the occupancy status from the electronic device 122 indicates the first vehicle seat 102A is occupied. An absence of the electronic device 122 from the seating zones 118 may be interpreted by the vehicle seat control system 100 as the seating zones 118 being unoccupied, resulting in a deactivation of the airbag safety device 134 until the first vehicle seat 102A becomes occupied.

Figure 8:
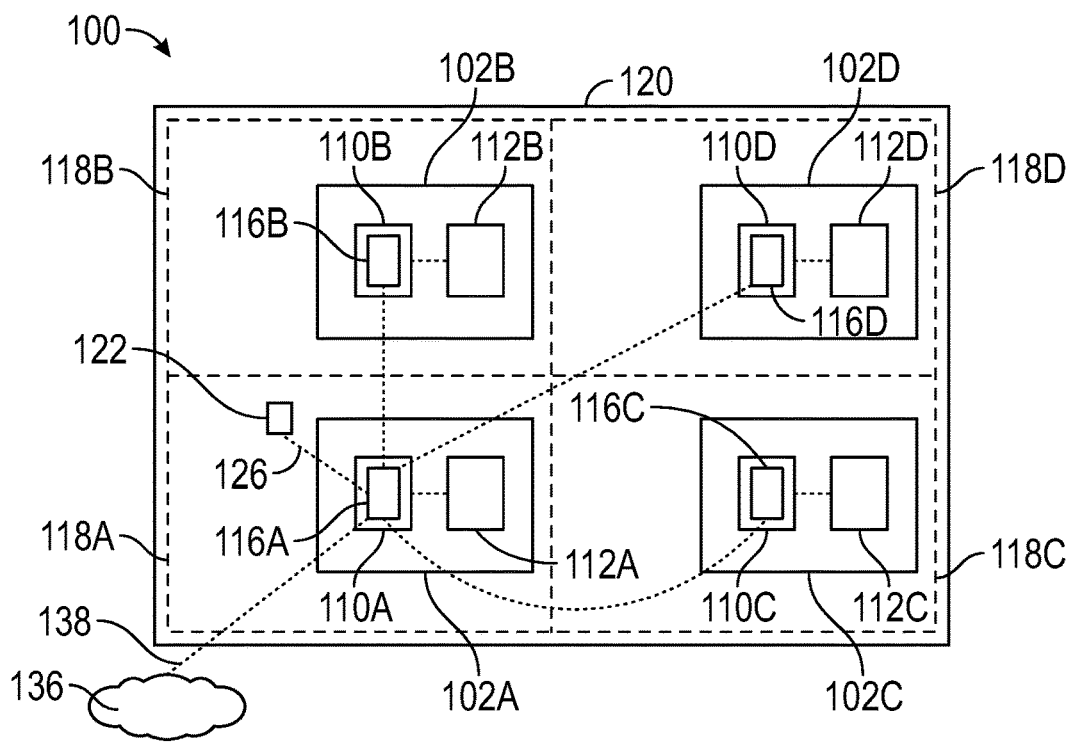
FIG. 8 is a schematic view showing the vehicle seat control system of FIG. 1 wherein a fourth seat customization function receives data from a cloud storage system according to the electronic device.

Referring now to FIG. 8, there is illustrated an example of the vehicle seats 102 where the first controller 110A controls the first seat customization function 112A according to the electronic device 122 to receive first data from the electronic device 122 and second data from a cloud storage system 136. The cloud storage system 136 is in communication with the data network 114 via a wireless data link 138. As a non-limiting example, the first data received by the first controller 110A from the electronic device 122 may result in the first controller 110A downloading the second data from the cloud storage system 136. Both the first and second data are then communicated to the first seat customization function 112A. For example, the first data received may be a playlist for music or video and the second data received from the cloud storage system 136 the music or video on the playlist. Alternatively, the first data may be an identifier for the user of the electronic device 122 and the second data may be a setting for the first seat customization function 112A. The setting is set by the user. The first controller 110A then controls the first seat customization function 112A to satisfy the setting. Alternatively, the second data may reside on, or otherwise be stored by, the first controller 110A.

Additional data may also be transmitted from the first seat customization function 112A to the cloud storage system 136 via the electronic device 122. As a non-limiting example, the additional data transmitted from the first seat customization function 112A to the cloud storage system 136 may include behaviors and/or preferences of the seat occupant. The additional data, once received by the cloud, may be analyzed, including analysis with data received for occupants of the second, third, and fourth vehicle seats 102B, 102C, and 102D, respectively, or occupants of vehicle seats 102 in vehicles other than the vehicle 120.

Figure 9:
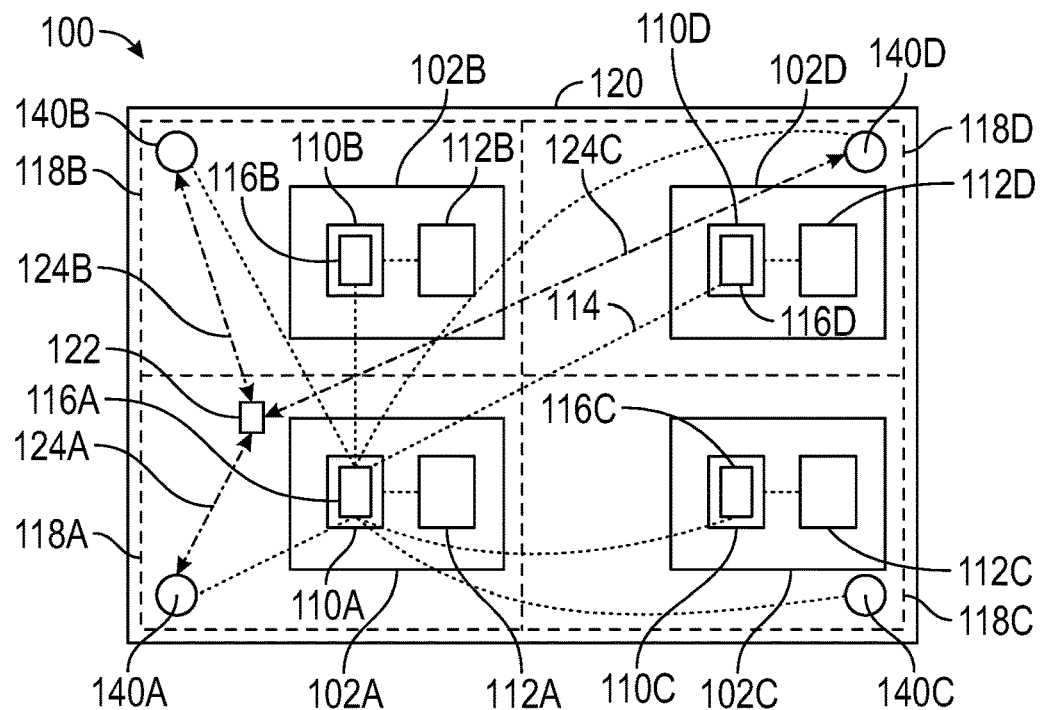
FIG. 9 is a schematic view of a vehicle seat control system according to another embodiment of the present invention.

Referring now to FIG. 9, there is illustrated an alternative arrangement of wireless receivers for measuring the signal strengths and times of flight for the electronic device 122. The signal strengths and times of flight are measured by the first controller 110A using first, second, third, and fourth standalone wireless receivers 140A, 140B, 140C, and 140D, respectively. The first, second, third, and fourth standalone wireless receivers 140A, 140B, 140C, and 140D, respectively, are external to both first, second, third, and fourth seats 102A, 102B, 102C, and 102D, respectively, and the first, second, third, and fourth controllers 110A, 110B, 110C, and 110D, respectively. The first, second, third, and fourth standalone wireless receivers 140A, 140B, 140C, and 140D, respectively, are connected via the data network 114 to the first, second, third, and fourth controllers 110A, 110B, 110C, and 110D, respectively. The first, second, third, and fourth wireless receivers 122A, 122B, 122C, and 122D, respectively, may still be provided for the wireless portion of the data network 114 to connect the first, second, third, and fourth controllers 110A, 110B, 110C, and 110D, respectively.

Furthermore, the vehicle seat control system 100 may have a combination of non-standalone wireless receivers such as the first, second, third, or fourth wireless receivers 122A, 122B, 122C, or 122D, respectively, that are incorporated into the first, second, third, and fourth controllers 110A, 110B, 110C, and 110D, respectively, together with standalone wireless receivers such as the first, second, third, and fourth standalone wireless receivers 140A, 140B, 140C, and 140D, respectively.

Figure 10:
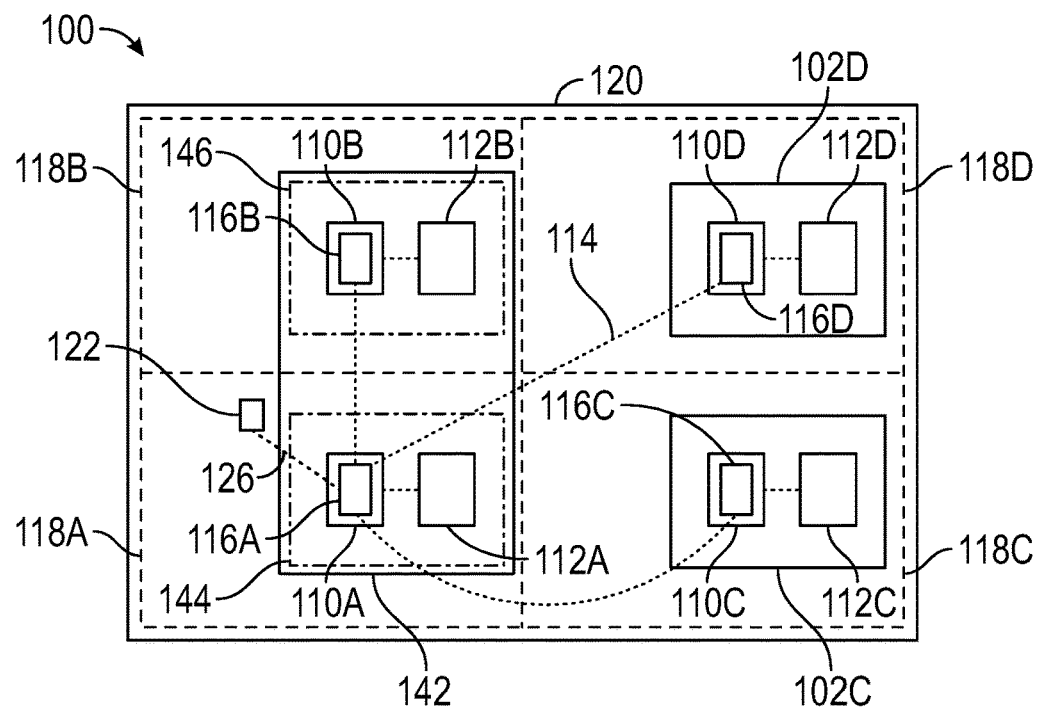
FIG. 10 is a schematic view of a vehicle seat control system according to another embodiment of the present invention.

Referring now to FIG. 10, there is illustrated the first and second vehicle seats 102A and 102B, respectively, combined as a bench seat 142. The bench seat 142 has first and second seating positions 144 and 146, respectively, for seat occupants. The first controller 110A, seat customization function 112A, wireless receiver 116A, and seating zone 118A are associated with the first seating position 144. Similarly, the second controller 110B, seat customization function 112B, wireless receiver 116B, and seating zone 118B are associated with the second seating position 146.

In accordance with the foregoing, a vehicle seat control system has been described having significant advantages over the prior art. Vehicle seats are provided for locating a smart device relative to the vehicle seats.

What is claimed is:

1. A vehicle seat control system comprising:
   a plurality of seats, wherein each of the seats has a respective seat customization function;
   a respective seating zone defined for each of the seats;
   a plurality of wireless receivers arranged about the seats and receiving a wireless signal from a portable electronic device;
   at least one controller for the seats that controls the seat customization functions, wherein the at least one controller:
      (a) measures signal strengths and signal times of flight for the wireless signal using the wireless receivers;
      (b) analyzes the signal strengths and the signal times of flight to detect a location of the electronic device;
      (c) determines if the location is in any of the seating zones; and
      (d) controls the seat customization function of a specific seat of the plurality of seats when the location is in the seating zone for the specific seat, wherein the seat customization function is controlled according to the electronic device; and
   a data network between the wireless receivers and the at least one controller.

2. The system of claim 1 wherein the seat customization function of the specific seat is controlled according to data received by the at least one controller from the electronic device.

3. The system of claim 2 wherein the data is streamed from the electronic device, through the at least one controller, and to the seat customization function of the specific seat.

4. The system of claim 2 wherein the data is audio or video that is streamed from the electronic device, through the at least one controller, and to the seat customization function of the specific seat.

5. The system of claim 2 wherein the data is audio streamed from the electronic device, the seat customization function of the specific seat is a speaker, and the audio is streamed from the electronic device, through the at least one controller, and to the speaker.

6. The system of claim 2 wherein the at least one controller receives the data and sends commands to the seat customization function to control the seat customization function according to the data.

7. The system of claim 2 wherein the data is a setting for the seat customization function of the specific seat.

8. The system of claim 7 wherein the seat customization function is a power seat adjustment device and the setting is a physical configuration for the power seat adjustment device.

9. The system of claim 1 further comprising:
a cloud storage system connected to the at least one controller by a wireless portion of the data network, wherein the seat customization function of the specific seat receives or transmits data from or to the cloud storage system according to the electronic device.

10. The system of claim 1 wherein the location in the seating zone indicates an occupancy status of the specific seat and the seat customization function of the specific seat is controlled according to the occupancy status.

11. The system of claim 10 wherein the seat customization function of the specific seat is an airbag safety device.

12. The system of claim 1 wherein the data network is a wireless network.

13. The system of claim 1 wherein the wireless receivers are Wi-Fi or Bluetooth transceivers.

14. The system of claim 1 wherein the at least one controller is a first controller performing the steps (a), (b), and (c) and a second controller performing the step (d).

15. The system of claim 1 wherein the at least one controller is a single controller performing the steps (a)-(d).

16. A vehicle seat control system comprising:
a first seating zone defined for a first seating position of a vehicle seat and a second seating zone defined for a second seating position of the vehicle seat;
a plurality of wireless receivers arranged about the first and second seating positions and receiving a wireless signal from a portable electronic device;
a first controller for the first seating position and a second controller for the second seating position, wherein one of the first or second controllers:
  (a) measures signal strengths and signal times of flight for the wireless signal using the wireless receivers;
  (b) analyzes the signal strengths and the signal times of flight to detect a location of the electronic device; and
  (c) associates the electronic device with the first seating position when the location is in the first seating zone and the second seating position when the location is in the second seating zone;
a data network between the first controller, the second controller, and the wireless receivers;
a first seat customization function of the first seating position, wherein the first controller controls the first seat customization function according to the electronic device when the location is in the first seating zone; and
a second seat customization function of the second seating position, wherein the second controller controls the second seat customization function according to the electronic device when the location is in the second seating zone.

17. A method of controlling a seat customization function of a vehicle seat, the method comprising:
measuring wireless signal strengths and wireless signal times of flight for a portable electronic device;
analyzing the wireless signal strengths and the wireless signal times of flight to detect a location of the electronic device;
determining if the location is in a seating zone defined for the vehicle seat;
associating the electronic device with the vehicle seat when the location is in the seating zone for the vehicle seat;
networking the associated electronic device with a controller for the seat customization function, wherein the networking is automatic after the electronic device is associated with the seating zone for the vehicle seat; and
controlling the seat customization function according to the associated electronic device.

18. The method of claim 17 further comprising:
receiving data from the electronic device to control the seat customization function according to the data.

19. The method of claim 17 further comprising:
receiving or transmitting data from or to a cloud storage system to control the seat customization function according to the electronic device.

20. The method of claim 17 wherein the location of the electronic device in the seating zone indicates an occupancy status of the vehicle seat and the seat customization function is controlled according to the occupancy status.

* * * * *